United States Patent
Abhishek et al.

(10) Patent No.: US 11,431,956 B2
(45) Date of Patent: Aug. 30, 2022

(54) INTERACTIVE OVERLAY HANDLING FOR IMMERSIVE TELECONFERENCING AND TELEPRESENCE FOR REMOTE TERMINALS

(71) Applicant: TENCENT AMERICA LLC, Palo Alto, CA (US)

(72) Inventors: Rohit Abhishek, Kansas City, MO (US); Iraj Sodagar, Palo Alto, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

(21) Appl. No.: 17/098,388

(22) Filed: Nov. 15, 2020

(65) Prior Publication Data

US 2022/0053176 A1    Feb. 17, 2022

Related U.S. Application Data

(60) Provisional application No. 63/064,252, filed on Aug. 11, 2020.

(51) Int. Cl.
| | |
|---|---|
| *H04N 7/15* | (2006.01) |
| *H04N 13/156* | (2018.01) |
| *H04N 5/232* | (2006.01) |
| *H04N 13/194* | (2018.01) |
| *H04N 13/167* | (2018.01) |
| *H04N 13/172* | (2018.01) |

(52) U.S. Cl.
CPC ....... *H04N 13/156* (2018.05); *H04N 5/23238* (2013.01); *H04N 7/15* (2013.01); *H04N 13/167* (2018.05); *H04N 13/172* (2018.05); *H04N 13/194* (2018.05)

(58) Field of Classification Search
CPC ........ H04N 13/156; H04N 5/232; H04N 7/15; H04N 13/167; H04N 13/172; H04N 13/194
USPC ............................................ 348/14.01–14.16
See application file for complete search history.

(56) References Cited

U.S. PATENT DOCUMENTS

2007/0299912 A1*  12/2007  Sharma .................. G06Q 10/10
                                                             709/204
2018/0316948 A1*  11/2018  Todd .................. H04N 21/4753
(Continued)

OTHER PUBLICATIONS

International Search Report dated Aug. 16, 2021 in Application No. PCT/US2021/031548.
(Continued)

*Primary Examiner* — Melur Ramakrishnaiah
(74) *Attorney, Agent, or Firm* — Sughrue Mion, PLLC

(57) ABSTRACT

A method, a non-transitory computer readable medium, and a computer system is provided for handling video streams. The method may include: receiving a 360° video stream, the 360° video stream including a multiple overlay parameter; when the multiple overlay parameter is a first value, determining that overlaying the 360° video stream with two or more overlays is permissible by the user terminal, and displaying, by the user terminal, the 360° video stream with the two or more overlays; and when the multiple overlay parameter is a second value, determining that overlaying the 360° video stream with two or more overlays is not permissible and displaying the 360° video stream with zero overlays or one overlay.

20 Claims, 9 Drawing Sheets

(56) References Cited

U.S. PATENT DOCUMENTS

2020/0014906 A1\* 1/2020 Wang .................... G06V 20/46
2020/0374505 A1\* 11/2020 Kammachi Sreedhar ..................
H04N 19/167

OTHER PUBLICATIONS

Written Opinion of the International Searching Authority dated Aug. 16, 2021 in Application No. PCT/US2021/031548.
"ITT4RT Permanent Document—Requirements, Working Assumptions and Potential Solutions", Intel, Nokia Corporation, 3GPP TSG-SA4 Meeting #109e Online Meeting, S4 200840, May 20-Jun. 3, 2020, 44 pages.

\* cited by examiner

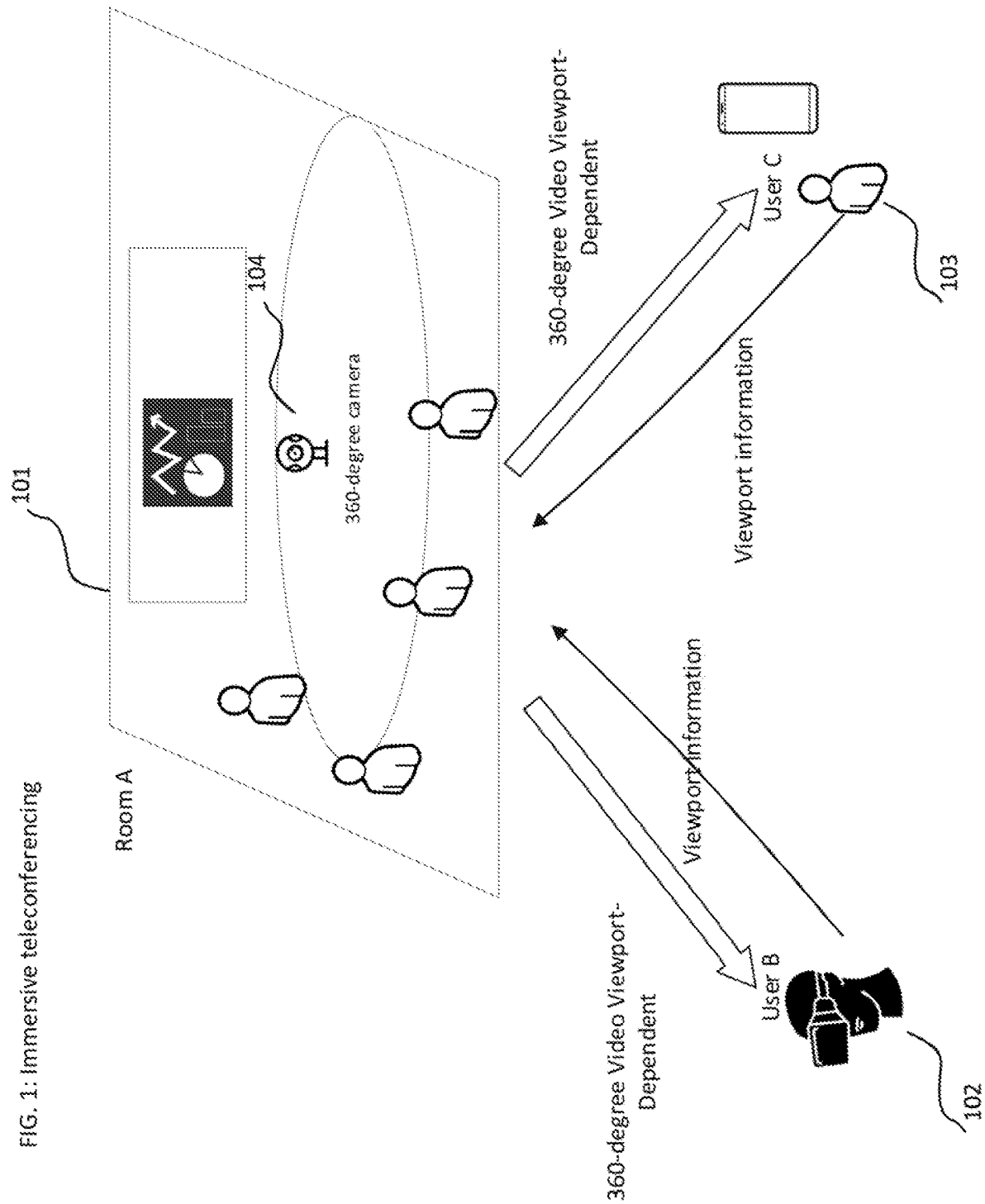

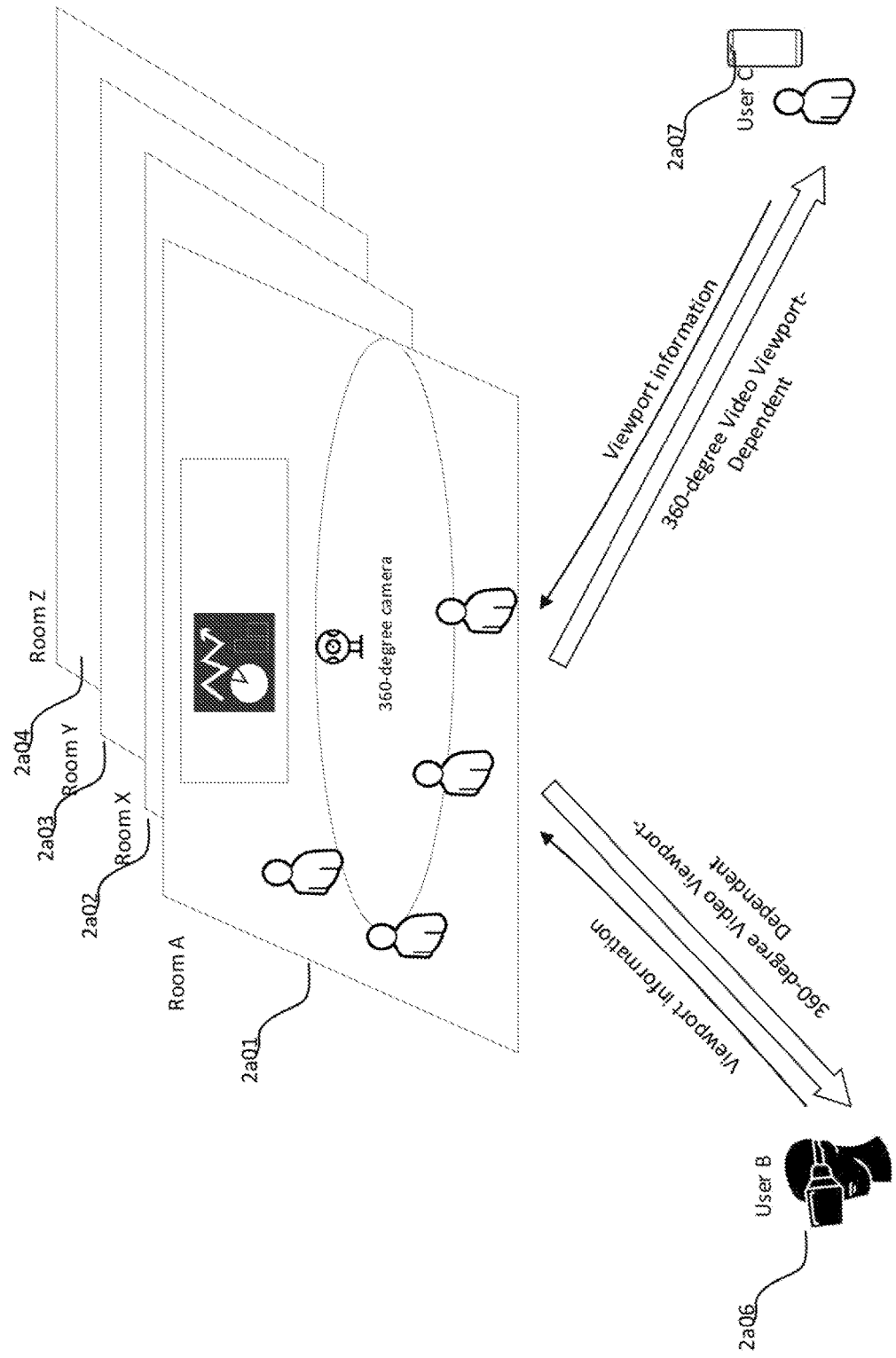
FIG. 2A: Multiparty multiconference room teleconferencing without MRF/MCU

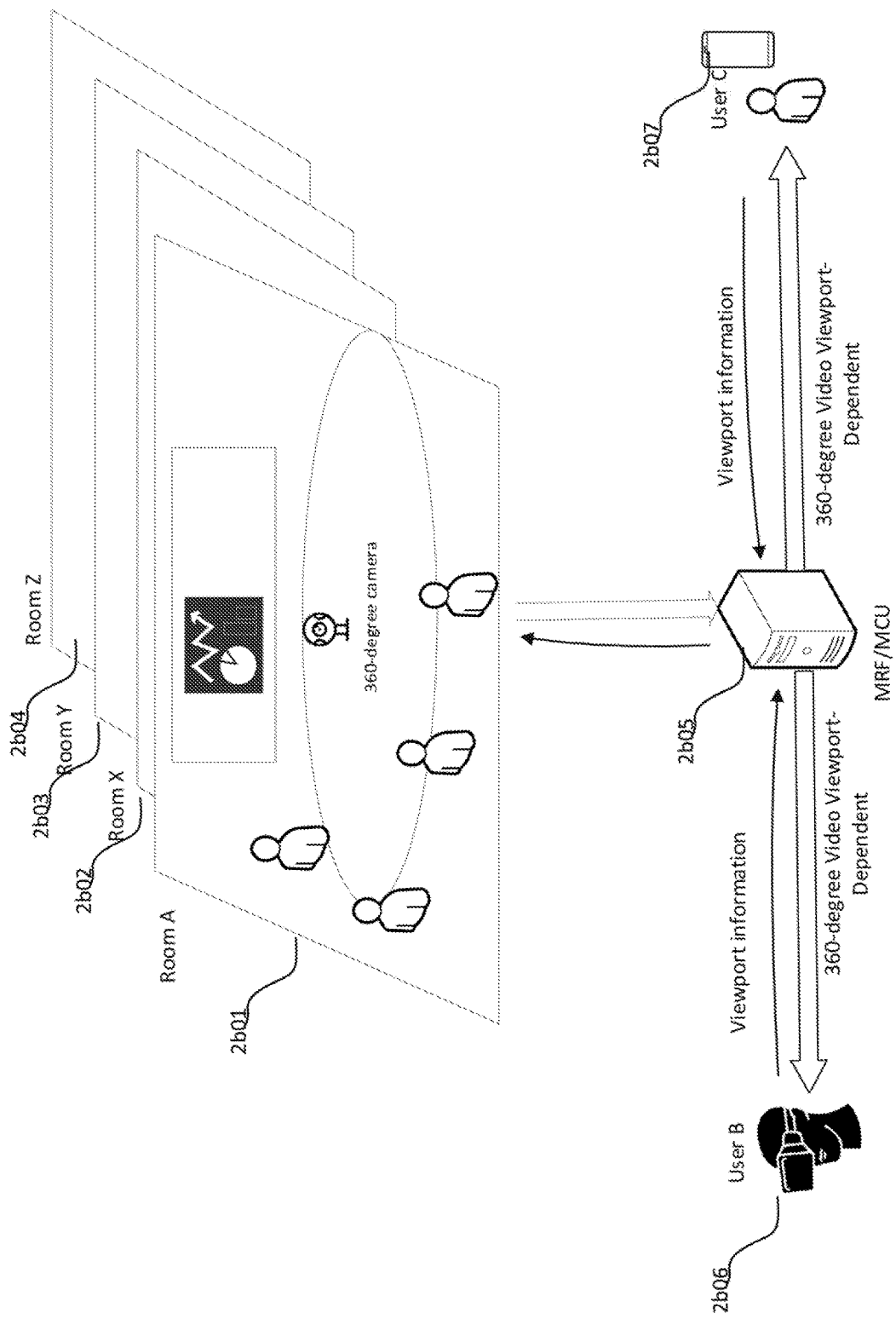
FIG. 2B: Multiparty multiconference room teleconferencing with MRF/MCU

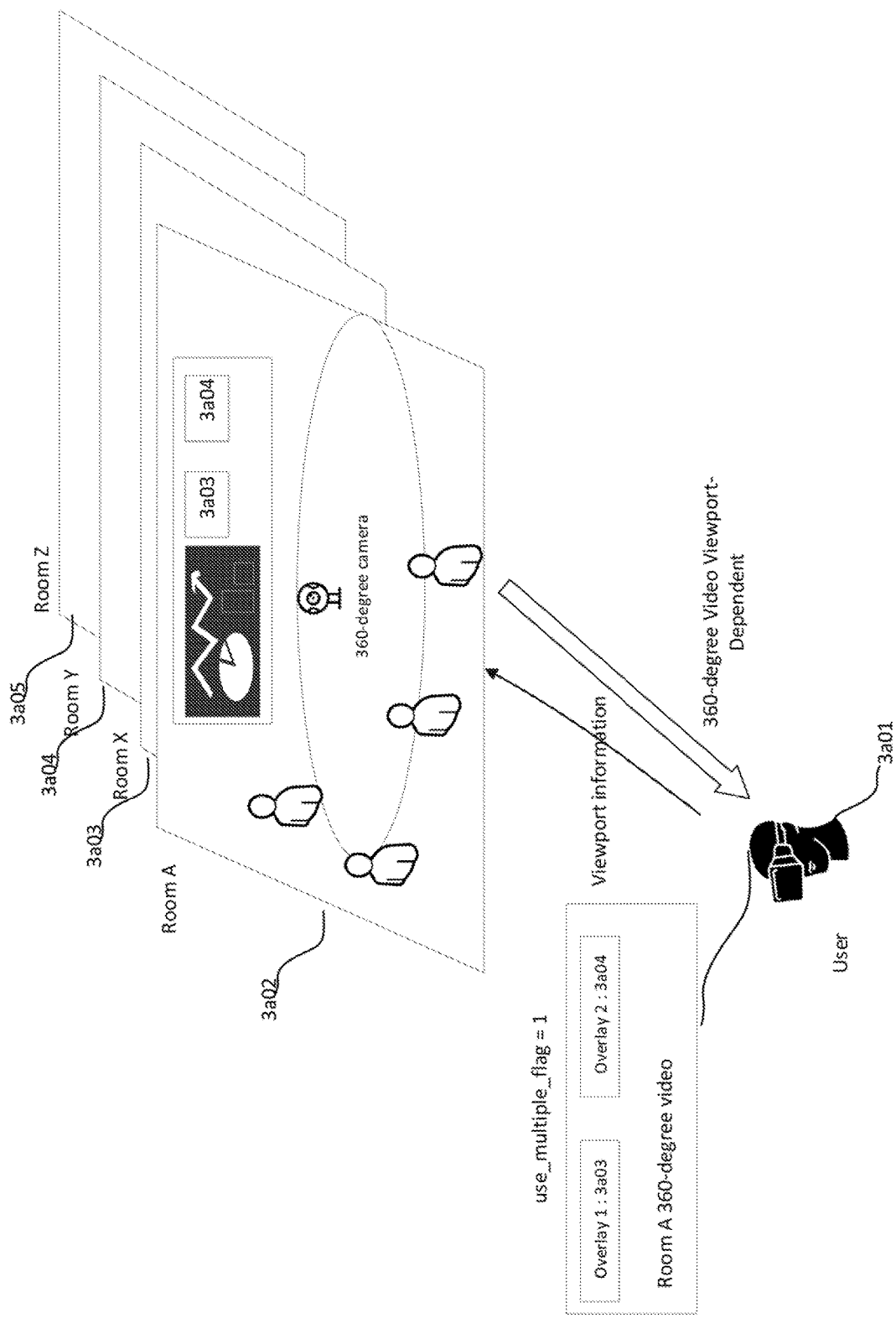
FIG. 3A: Multiparty multiconference room teleconferencing with multiple overlays from single sender without MRF/MCU

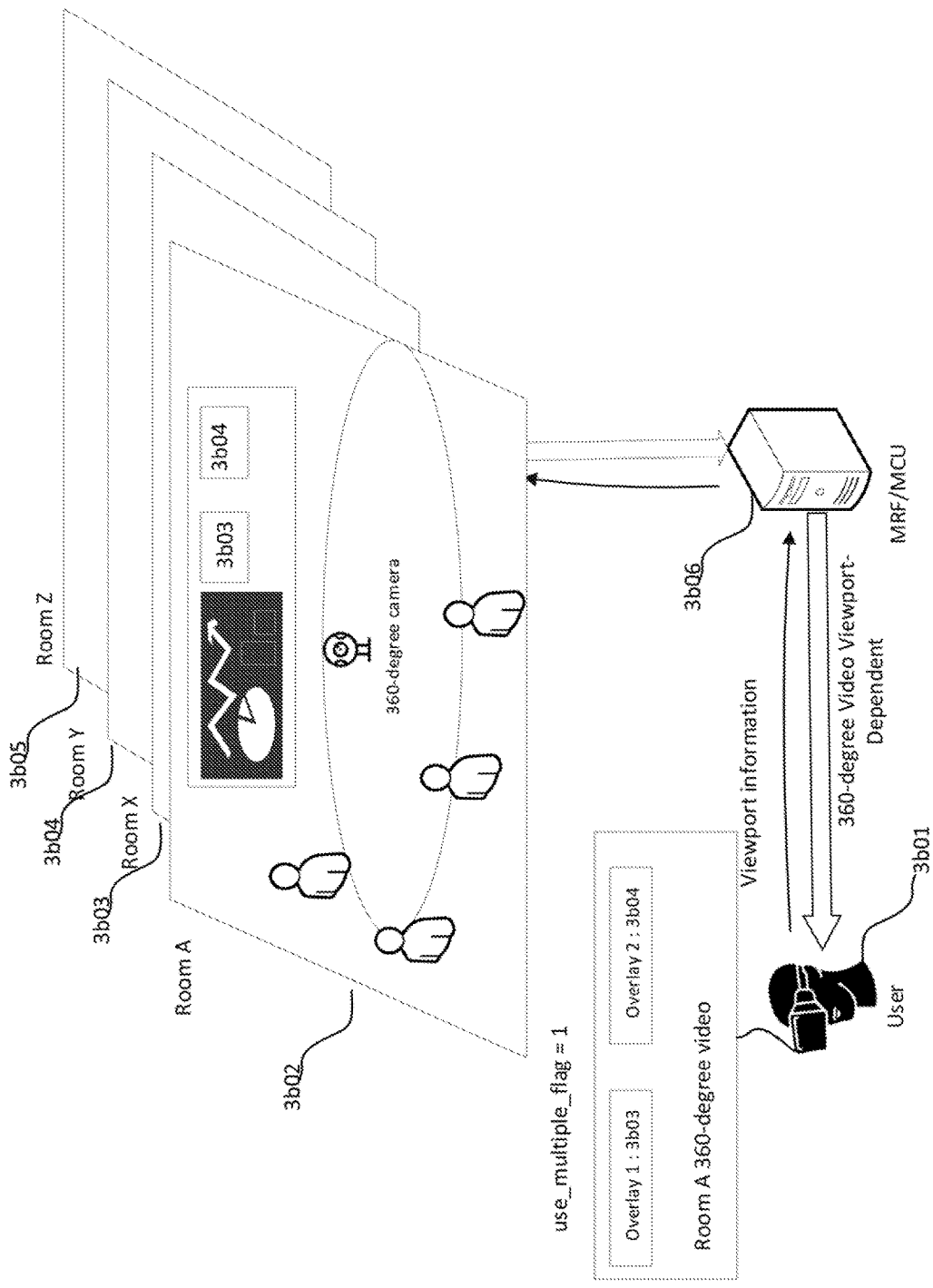
FIG. 3B: Multiparty multiconference room teleconferencing with multiple overlays from single sender without MRF/MCU

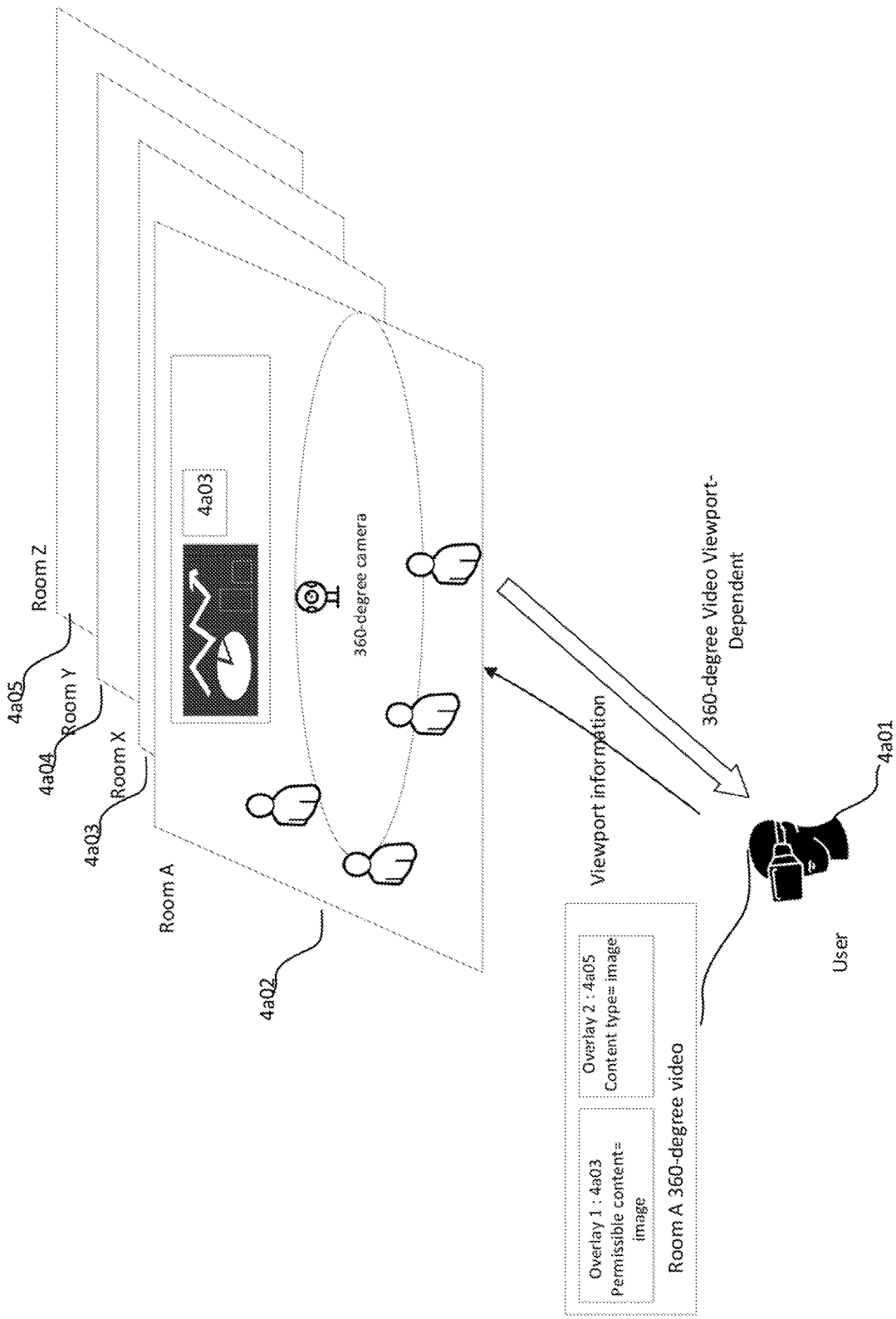
FIG. 4A: Multiparty multiconference room teleconferencing with multiple overlays from multi-sender without MRF/MCU

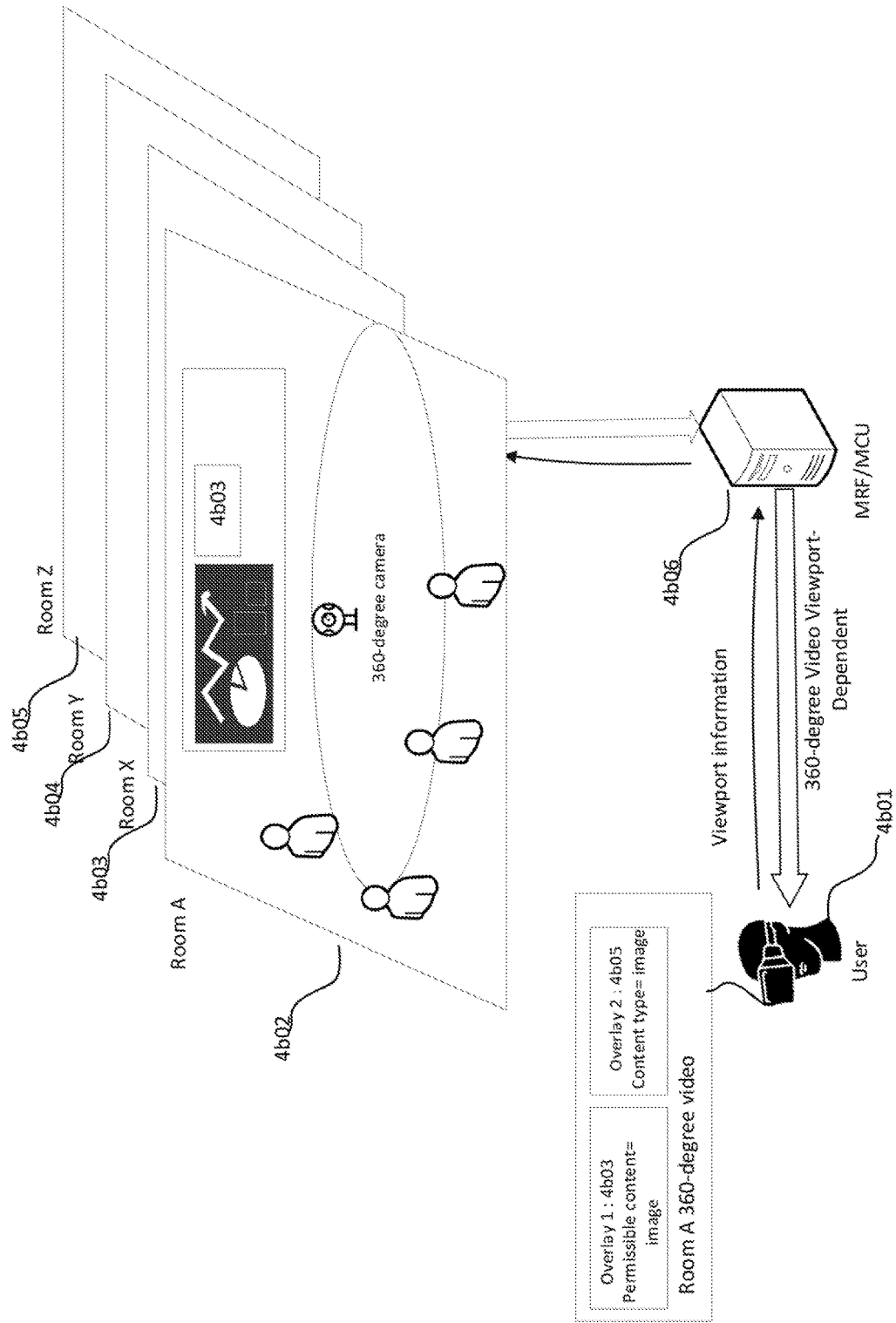
FIG. 4B: Multiparty multiconference room teleconferencing with multiple overlays from multi-sender with MRF/MCU

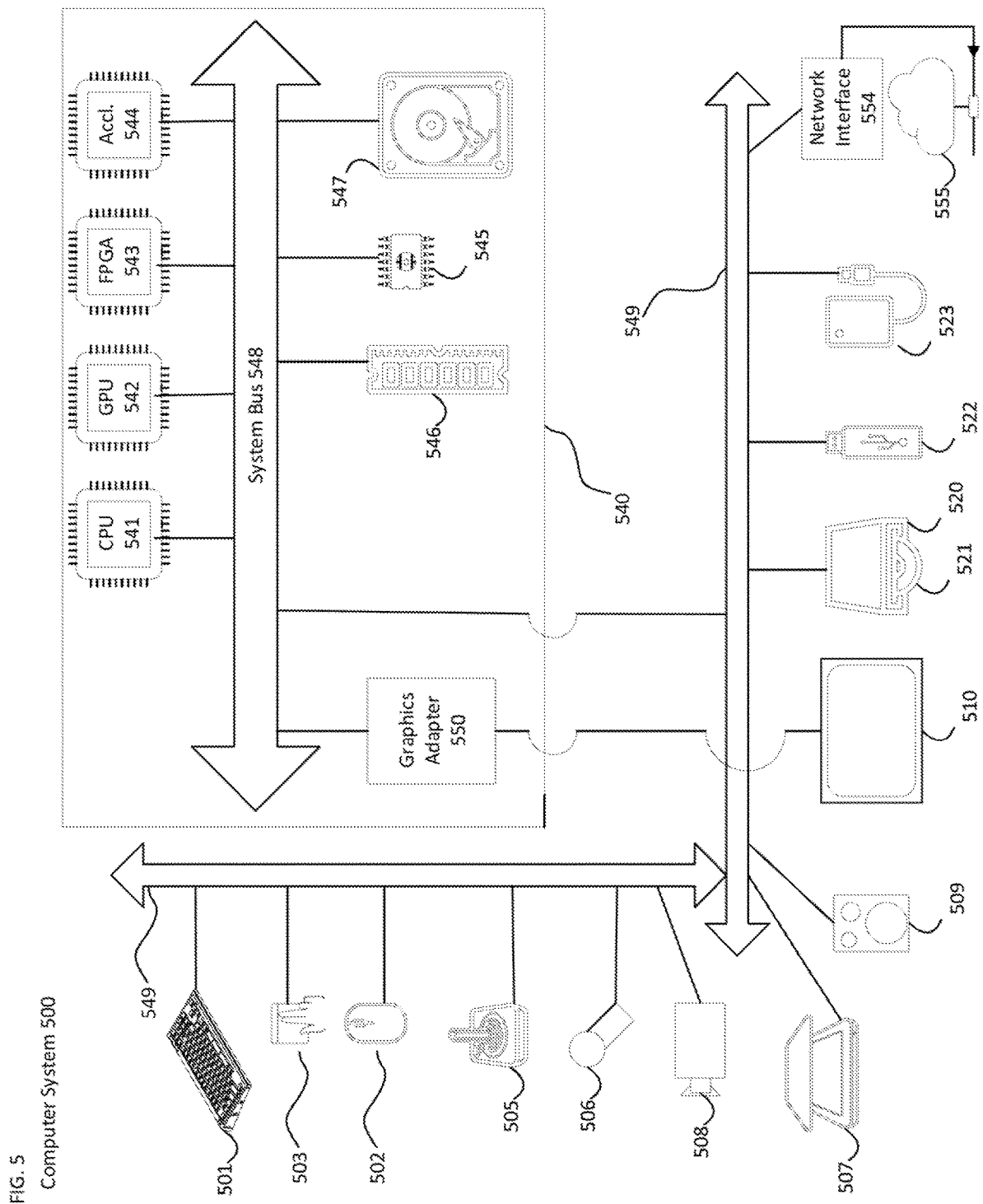

INTERACTIVE OVERLAY HANDLING FOR IMMERSIVE TELECONFERENCING AND TELEPRESENCE FOR REMOTE TERMINALS

PRIORITY INFORMATION

This application claims the benefit of priority from U.S. Provisional Application No. 63/064,252 filed Aug. 11, 2020, which is hereby incorporated by reference in its entirety.

FIELD

The disclosure relates generally to the field of data processing, and more particularly to overlay handling, such as interactive multiple overlay handling for Immersive Teleconferencing and Telepresence for Remote Terminals (ITT4RT). For example, the signaling of multiple interactive overlays for omnidirectional video and images, such as when a presentation/screen share stream or a two-dimensional (2D) video is being displayed as an overlay on top of a displayed 360° video stream.

BACKGROUND

An overlay is a piece of visual media rendered over an omnidirectional video, an image item, or a viewport.

When an omnidirectional media stream is used, only the part of the content corresponding to the user's viewport is rendered, while using, for example, a head-mounted display (HMD) device, giving the user a realistic view of the media stream.

SUMMARY

Embodiments relate to a method, system, and non-transitory computer readable medium for streaming video data. According to one aspect, a method for streaming video data may be provided. The method may include: receiving, by a user terminal, from an electronic device or a server, a 360° video stream, wherein the 360° video stream includes a multiple overlay parameter that indicates whether overlaying the 360° video stream with two or more overlays is permissible by the user terminal; displaying, by the user terminal, the 360° video stream; when the multiple overlay parameter is a first value, determining, by the user terminal, that overlaying the 360° video stream with two or more overlays is permissible by the user terminal, and displaying, by the user terminal, the 360° video stream with the two or more overlays; and when the multiple overlay parameter is a second value, determining, by the user terminal, that overlaying the 360° video stream with two or more overlays is not permissible by the user terminal, and displaying, by the user terminal, the 360° video stream with zero overlays or one overlay.

The first value may be different from the second value, and the overlay or overlays may include one or more of: another video stream, or an image.

The 360° video stream may include an overlap overlays parameter that indicates whether overlapping one of the two or more overlays with a first overlay is permissible.

The method may further comprise: displaying, by the user terminal, the one of the two or more overlays superimposed to overlap the first overlay with the 360° video stream when the overlap overlays parameter indicates that overlapping one of the two or more overlays with the first overlay is permissible.

The 360° video stream may include a content-based attribute that allows use of the two or more overlays.

The 360° video stream may include a flag to signal when the user is allowed to share a sender's stream info with other senders.

The method may further comprise: receiving, by the user terminal, a request from the electronic device or server, wherein the request is a request for one or more users in a teleconference to share media stream attributes; and transmitting, by the user terminal to the electronic device or server, information regarding media stream attributes that the user terminal authorizes sharing of.

The information regarding media stream attributes that the user is willing to share includes an identifier (ID) corresponding to a sender ID.

The method may further comprise: allocating, by the electronic device or server, a unique overlay ID by combining at least one sender ID with at least one overlay ID.

The method may further comprise: negotiating the multiple overlay parameter during an initial offer-answer negotiation or during a session.

The multiple overlay parameter may be offered in a session description protocol (SDP) of the 360° video stream.

The method may further comprise negotiating the overlap overlays parameter during an initial offer-answer negotiation or during a session.

The overlap overlays parameter may be offered in a session description protocol (SDP) of the 360° video stream.

The method may further comprise: negotiating the content-based attribute during an initial offer-answer negotiation or during a session.

The content-based attribute may be offered in a session description protocol (SDP) of the 360° video stream.

The method may further comprise: communicating, by the user terminal to the electronic device or server, whether another user is authorized to share stream information shared by the user terminal with other electronic devices.

The method may further comprise: communicating, by the user terminal to the electronic device or server, whether another user is authorized to share stream information shared by the user terminal with other electronic devices.

The method may further comprise: sharing, by the electronic device or server, at least one additional overlay besides any overlay or overlays produced by the electronic device or server with the other electronic devices, wherein the at least one additional overlay includes only overlays where a sender of the corresponding overlay video authorized sharing of the overlay.

According to an embodiment, a computer system for video conferencing may be provided, which may comprise: a communication interface; a display; one or more computer-readable non-transitory storage media configured to store computer program code; and one or more computer processors configured to access said computer program code and operate as instructed by said computer program code.

The computer program code may include: receiving code configured to cause the one or more computer processors to receive, via the communication interface, a 360° video stream, wherein the 360° video stream includes a multiple overlay parameter that indicates whether overlaying the 360° video stream with two or more overlays is permissible by the user terminal; displaying code configured to cause the one or more computer processors to control the display to display the received 360° video stream; multiple overlay authorized code configured to cause the one or more computer processors to: when the multiple overlay parameter is a first value, determine that overlaying the 360° video stream with two or more overlays is permissible by the user terminal, and control the display to display the 360° video stream with the two or more overlays; and multiple overlay unauthorized code configured to cause the one or more computer processors to: when the multiple overlay parameter is a second value, determine that overlaying the 360° video stream with two or more overlays is not permissible by the user terminal, and control the display to display the 360° video stream with zero overlays or one overlay.

The first value may be different from the second value, and the overlay or overlays may include one or more of: another video stream, or an image.

The 360° video stream may include an overlap overlays parameter that indicates whether overlapping one of the two or more overlays with a first overlay is permissible, and the computer program code may further comprise: overlap overlays authorized code configured to cause the at one or more processors to: control the display to display the one of the two or more overlays superimposed to overlap the first overlay with the 360° video stream when the overlap overlays parameter indicates that overlapping one of the two or more overlays with the first overlay is permissible.

According to an embodiment, a non-transitory computer readable medium having stored thereon a computer program configured to cause one or more computer processors to: receive a 360° video stream, wherein the 360° video stream includes a multiple overlay parameter that indicates whether overlaying the 360° video stream with two or more overlays is permissible; control a display to display the received 360° video stream; when the multiple overlay parameter is a first value, determine that overlaying the 360° video stream with two or more overlays is permissible, and control the display to display the 360° video stream with the two or more overlays; and when the multiple overlay parameter is a second value, determine that overlaying the 360° video stream with two or more overlays is not permissible, and control the display to display the 360° video stream with zero overlays or one overlay, wherein the first value is different from the second value, and wherein the overlay or overlays include one or more of: another video stream, or an image.

The 360° video stream may include an overlap overlays parameter that indicates whether overlapping one of the two or more overlays with a first overlay is permissible, and the computer program may be further configured to cause the one or more computer processors to: control the display to display the one of the two or more overlays superimposed to overlap the first overlay with the 360° video stream when the overlap overlays parameter indicates that overlapping one of the two or more overlays with the first overlay is permissible.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 is a schematic illustration of the ecosystem for immersive teleconferencing;

FIG. 2A is a schematic illustration of multiparty multiconference room teleconferencing without MRF/MCU;

FIG. 2B is a schematic illustration of multiparty multiconference room teleconferencing with MRF/MCU;

FIG. 3A illustrates the use of the parameter "use_multiple_flag" for a multiparty multiconference room teleconferencing with multiple overlays from a single sender without MRF/MCU;

FIG. 3B illustrates the use of the parameter "use_multiple_flag" for a multiparty multiconference room teleconferencing with multiple overlays from a single sender with MRF/MCU;

FIG. 4A demonstrates content based use of other overlays for multiparty multiconference room teleconferencing with multiple overlays from multi-sender without MRF/MCU;

FIG. 4B demonstrates content based use of other overlays for multiparty multiconference room teleconferencing with multiple overlays from multi-sender with MRF/MCU according to an embodiment;

FIG. 5 is a schematic illustration of a computer system according to an embodiment.

DETAILED DESCRIPTION

Figure 6:
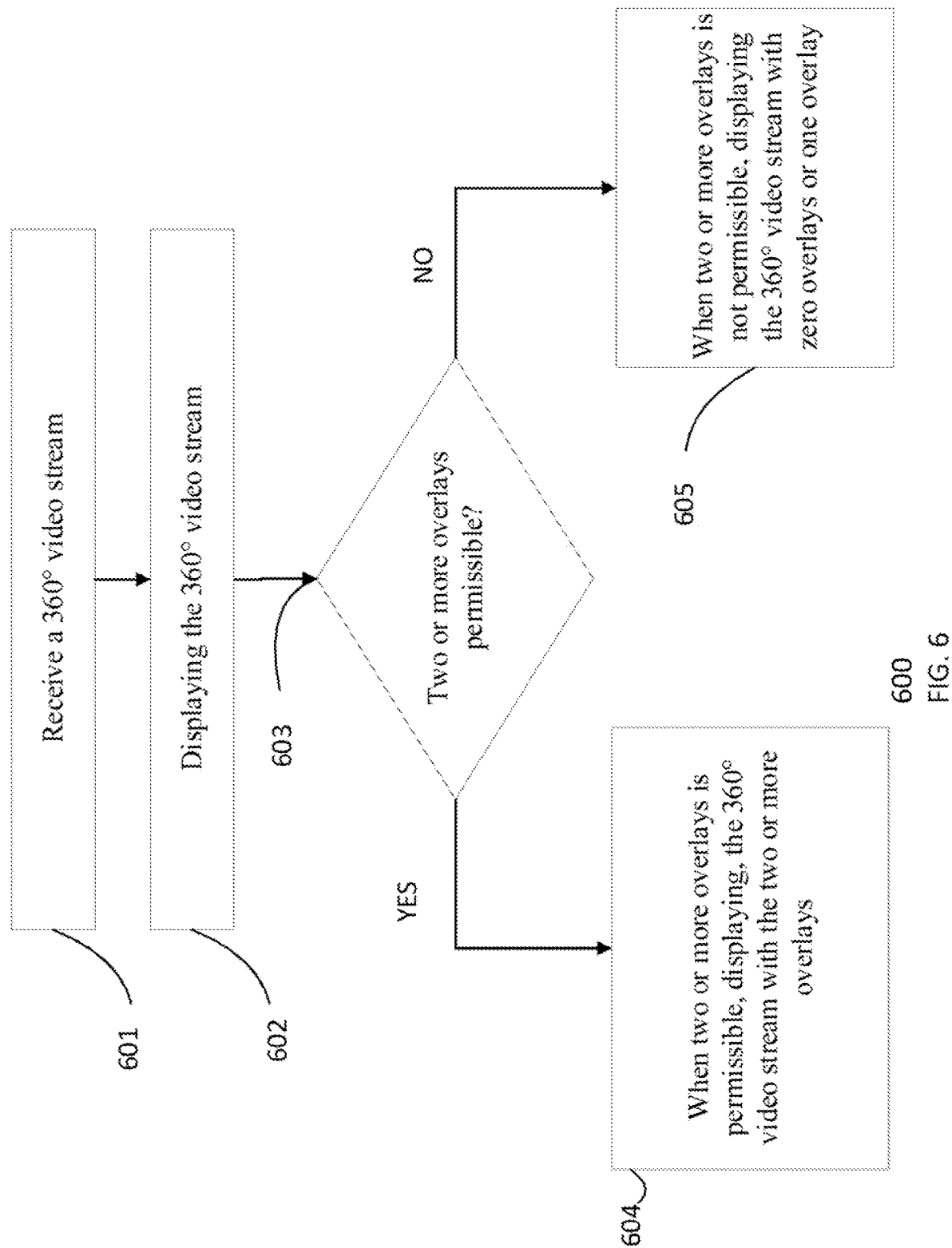
FIG. 6 shows an operational flowchart illustrating the steps of a method for handling a video conference.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to video conferencing/teleconferencing using omnidirectional video. The following described exemplary embodiments provide a system, method and computer program to, among other things, handle video conferencing/teleconferencing using omnidirectional video.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

FIG. 1 illustrates a scenario, according to an embodiment, of an immersive teleconference call, where the call is organized among Room A (101), User B (102), and User C (103). According to an embodiment, Room A represents a conference room with an omnidirectional (360°) camera (104), and Users B and C are remote participants using a HMD device and a mobile device, respectively. In this case, teleconference call participants User B and User C may send information regarding their respective viewport orientations to Room A, which in turn may send back to them the viewport dependent stream.

FIG. 2A illustrates another scenario, according to an embodiment, of an immersive teleconference call comprising multiple conference room participants (Room A (2a01), Room X (2a02), Room Y (2a03), Room Z (2a04)). According to an embodiment, a User B (2a06) may use an HMD display to view the video stream (e.g., a 360° video stream), and a User C (2a07) may use a mobile device to view the video stream. User B and User C may send their viewport orientation to a host room (e.g., Room A), which in turn sends them the viewport dependent stream.

According to an embodiment, another scenario where the video call is set-up using a Media Resource Function (MRF)/Media Control Unit (MCU) (2b05), as shown in FIG. 2B, where the MRF/MCU are shown as multimedia servers that provide media-related functions for bridging remote terminals in a multiparty conference call. However, the MRF/MCU may be another electronic device besides a server. According to an embodiment, electronic devices corresponding to the individual conference rooms may send their respective videos to the MRF/MCU. These videos are viewport independent videos (i.e., the entire 360° video is sent to the MRF/MCU (e.g., media-server) irrespective of the user's viewport streaming the particular video. The media server may receive the viewport orientations of the User (B (2b06) and User C (2b07) and accordingly send User A and User B the respective viewport-dependent streams.

Further, in the extended scenario, the remote users can choose one of the available 360° videos from the conference rooms (2a01-2a04/2b01-2b04) to view. In this case, the user sends the information (e.g., a request) to the conference room or MRF/MCU about the video it would like to stream and its viewport orientation. According to an embodiment, the user can trigger switching from one room to another based on the active speaker. That is, according to an embodiment, a user terminal that is providing a current voice output may be used for determining a viewport orientation such that the viewport orientation corresponds to the active speaker. In addition, the media-server may pause receiving a video stream from any conference room which does not have any active users.

An overlay is a piece of visual media rendered over an omnidirectional video, an image item, or a viewport.

Referring back to FIGS. 2A and 2B, when a presentation is being shared by any participant in Conference Room A, besides being displayed in Conference Room A, the presentation may also be broadcasted as a stream to other users (e.g., remote terminals associated with the users, such as a smartphone or HMD device).

According to an embodiment, the stream may be overlaid on top of the 360° video.

According to an embodiment, overlays may also be used for 2D streams.

According to an embodiment, there may be at least two types of overlay rendering defined for use in ITT4RT. A first type may be a viewport-relative overlay, and a second type may be a Sphere-relative 2D overlay.

According to an embodiment, for "Viewport Related Overlays," one or more of the following parameters can be defined for ITT4RT: overlay_ID, overlay_rect_left_percent, overlay_rect_top_percent, overlay_rect_width_percent, overlay_rect_height_percent, relative_disparity_flag, disparity_in_percent, and disparity_in_pixels, name.

According to an embodiment, one or more parameters may be defined for "Sphere-relative two-dimensional overlay" which is aligned with Open Mobile Access Abstract Framework (OMAF) specifications, such as: overlay_ID, overlay_azimuth, overlay_elevation, overlay_tilt, overlay_azimuth_range, overlay_elevation_range, overlay_rot_yaw, overlay_rot_pitch, and overlay_rot_roll, region_depth_minus1, and timeline_change_flag, name.

With respect to the user interactions with overlays, the overlay signally may include one or more of the following parameters additionally: change_position_flag, change_depth_flag, switch_on_off_flag, change_opacity_flag, resize_flag, rotation_flag, change_position_flag, change_depth_flag, switch_on_off_flag, change_opacity_flag, resize_flag, or rotation_flag, use_other_overlay_flag.

According to an embodiment, an overlay parameter may be used that specifies whether a user is allowed to use more than one overlay on top of the 360° video.

According to an embodiment, an overlay parameter may be used to define whether the user is allowed to overlap two or more overlays.

According to an embodiment, an overlay parameter may be used to define a content-based attribute based on which "user_other_overlay_flag" may be used.

According to an embodiment, a sender may obtain the information of other overlays in the teleconferencing to be aware of possible combinations, and signal which overlays of other senders may be combined with its own video, by using a combination of sender identifier (ID) and overlay ID(s) or building a unique ID based on the sender ID and the overlay ID(s).

With respect to immersive teleconferencing, when multiple overlay videos or images are superimposed on a 360° video, the following information may be included, such as:
 a. the overlay sources which specifies the image or the video being used as an overlay
 b. overlay rendering type describing if the overlay is anchored relative to the viewport or sphere
 c. rendering properties such as opacity
 d. user interaction properties Referring back to FIGS. 2A and 2B, where multiple conference rooms with an omnidirectional camera are in a teleconference, and a user chooses video stream from one of the conference rooms to be displayed as an immersive video. Now, when any additional presentation material/share screen is used with the 360° video the user is streaming, it is sent as a separate stream as an overlay on top of the 360° video.

According to an embodiment, as shown in FIG. 3A, where a user (3a01) is streaming an immersive video, on his electronic device (e.g., an HMD), from a teleconference Room A (3a02). Room A may use screen share to display the video streams coming from conference Room X (3a03) and Room Y (3a04), where Room X is streaming a 2D video stream, and Room Y streams a presentation stream (e.g., a slideshow presentation or chart). According to an embodiment, the streams from Room X and Room Y may also be broadcasted to all other remote users.

According to an embodiment, a multiple overlay flag may be defined for the user to allow displaying more than one overlay. According to an embodiment, the more than one overlay may include an additional overlay from the sender of the 360° video as well as from other users.

When the multiple overlay flag is set to 1, the user streaming the 360° video may be allowed to use multiple overlays on top of the 360° video.

According to an embodiment, when the multiple overlay flag is set to 0, the user at the receiver man only use one overlay. Of course, other values besides 0 and 1 may be used, but it is noted that one bit may be used for the multiple overlay flag using 0 and 1.

According to an embodiment, the multiple overlay flag value may be set by the sender of the 360° video.

According to an embodiment, the multiple overlay flag may be offered in the session description protocol (SDP)

during an initial offer-answer negotiation and may also be re-negotiated during the sessions.

According to another embodiment, a same or similar use of the multiple overlay flag may be used, as shown in FIG. 3B, when MRF/MCU (3*b*06) is used for setting up the call.

In the same or another embodiment, an additional flag, such as an overlay overlap flag may be defined.

According to an embodiment, the overlay overlap flag may indicate whether the user is allowed to overlap overlays from another sender onto the overlays shared by the sender of the 360° video.

According to an embodiment, by default, the overlay overlap flag may be equal to 0.

According to an embodiment, when the overlay overlap is set to 1, the user may overlap overlays from another sender onto the overlay from the sender of the 360° video.

According to an embodiment, the parameter may be set by the sender of the 360° video and may be offered during the initial offer-answer negotiation and may also be re-negotiated during the sessions.

According to the same or another embodiment, refer to FIG. 4A, when considering the scenario where the client (e.g., User 4*a*01) desires to use the 360° video stream from Room A (which uses screen share to display a stream from Room X), but also desires to use an overlay from Room Z (4*a*05) whose streams are not shared by Room A (in addition to simultaneously streamlining the stream shared by Room A).

According to an embodiment, a flag "use_other_overlay_flag" may be used which specifies whether the users are allowed to use overlays from other senders which are not shared by the sender of the 360° video.

According to an embodiment, the value of flag "use_other_overlay_flag" may be set by the sender whose 360° video is being streamed.

According to an embodiment, the "use_other_overlay_flag" may be based on the content type of the overlay the sender of the 360° is sharing.

According to an embodiment, the content type may be defined during the initial offer answer negotiation in the SDP signaling by including an attribute "a=permissible_content" under m=line for each overlay the sender is sharing.

According to an embodiment, a similar or the same content type defining and usage of the overlay flags may be used for the embodiment(s) of FIG. 4B used for setting up the video call.

In the same or another embodiment, when the teleconference call is initiated the sender of the 360° video may send a request to all other users in the conference inquiring about their receiving of media stream attributes. This is to know about the content types of all the overlays each user may receive in the teleconference. The users may wish to share or not share its information with the sender. This may be based on the security aspect of the users.

According to an embodiment, a sender may signal whether a user is allowed to share this information with other senders/users too. When it is not allowed, the user may not share the sender's streams with other senders.

According to an embodiment, when the sender receives the reply from the user including the information of the streams from the other sender, the sender may use each sender ID along with each overlay ID to assign a globally unique overlay ID(s) to all overlays in the teleconference session.

According to an embodiment, the building of the global unique IDs may be shared with all the senders and users, so that the global unique IDs may be parsed and processed by all entities.

According to a same or similar embodiment, when a sender allows a user to communicate its video streams to others senders, the sender may set a "share_streams_info_allowed" flag when the sender communicates with (e.g., transmits to) a user.

In the same embodiment, if the users accept the sender's request to share its attributes, it may also include the flags "multiple_overlay_flag", "overlay_overlap_flag" to communicate if other overlays maybe used with its media stream.

In the same or a similar embodiment, when the user(s) accepts the sender's request to share the user attributes (or sender attributes), an attribute which specifies a permissible content type which may be used with the media stream may be included.

According to an embodiment, the sender after receiving the reply from users about their media streams, may send only selected overlays to the user which may be based on the attributes of other overlays.

Although the interaction of users is explained in the description above, it is noted that the user interactions are facilitated by electronic devices, such as a smartphone or HMD device. Thus, when the specification describes a user being allowed to perform an action, the disclosure is directed at a remote terminal associated with the user, which the user is using (e.g., a remote terminal dialed into a video call), that is allowed (or not allowed) to perform the action.

The techniques for overlay handling for immersive teleconferencing and telepresence, described above, can be implemented as computer software using computer-readable instructions and physically stored in one or more computer-readable media. For example, FIG. 5 shows a computer system 500 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 5 for computer system 500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 500.

Computer system 500 may include certain human interface input devices. Such as a human interface input device may be responsive to input by one or more human users through, for example, tactile input (such as keystrokes, swipes, data glove movements), audio input (such as voice, clapping), visual input (such as gestures), olfactory input. The human interface devices may also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

According to embodiments, input human interface devices may include one or more of: keyboard 501, mouse 502, trackpad 503, touch screen 510, data-glove, joystick 505, microphone 506, scanner 507, or camera 508.

According to an embodiment, computer system 500 may also include certain human interface output devices. Such human interface output devices may be stimulating the senses of one or more human users through, for example, tactile output, sound, light, and smell/taste. Such human interface output devices may include one or more tactile output devices (for example tactile feedback by the touch-screen 510, data-glove, or joystick 505, but there can also be tactile feedback devices that do not serve as input devices), audio output devices (such as speakers 509, headphones), visual output devices (such as screens 510 to include Cathode-ray tube (CRT) screens, liquid crystal display (LCD) screens, plasma screens, light emitting diode (LED), such as organic LED (OLED) screens, each with or without touchscreen input capability, each with or without tactile feedback capability—some of which may be capable to output two-dimensional visual output or more than three-dimensional output through means such as stereographic output; virtual-reality glasses, holographic displays and smoke tanks), and printers.

According to an embodiment, computer system 500 may also include human accessible storage devices and their associated media such as optical media including compact disc (CD) Read-Only Memory (ROM)/Read/Write Memory (RW), or Digital Versatile Disc (DVD) ROM/RW or a combination of CD/DVD ROM/RW 520 with CD/DVD or the like media 521 may be used. In addition or alternatively, one or more of the following may be used for storage: a thumb-drive 522, a removable hard drive or a solid-state drive (SSD) 523, legacy magnetic media such as tape and floppy disc, specialized ROM/Application Specific Integrated Circuit (ASIC)/programmable logic device (PLD) based devices such as security dongles, and the like.

Those skilled in the art should also understand that term "computer-readable media" as used in connection with the presently disclosed subject matter does not encompass transmission media, carrier waves, or other transitory signals. That is, the computer-readable media is directed at non-transitory computer-readable media.

According to an embodiment, computer system 500 may also include an interface to one or more communication networks. Networks can, for example, be wireless, wireline, optical. Networks can further be local, wide-area, metropolitan, vehicular and industrial, real-time, delay-tolerant, and so on. Examples of networks include local area networks such as Ethernet, wireless local area networks (LANs), cellular networks to include Global System for Mobile communications (GSM), third generation (3G), fourth generation (4G), fifth generation (5G), Long-Term Evolution (LTE), or any other communication standard, television (TV) via wired or wireless wide-area digital networks to include cable TV, satellite TV, and terrestrial broadcast TV, vehicular and industrial to include a Controller Area Network bus (CANBus), and so forth. Certain networks commonly require external network interface adapters that attached to certain general-purpose data ports or peripheral buses (549) (such as, for example, universal serial bus (USB) ports of the computer system 500; others are commonly integrated into the core of the computer system 500 by attachment to a system bus as described below (for example Ethernet interface into a personal computer (PC) computer system or cellular network interface into a smartphone computer system). Using any of these networks, computer system 500 may communicate with other entities. Such communication can be uni-directional, receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 540 of the computer system 500.

The core 540 may include one or more Central Processing Units (CPU) 541, Graphics Processing Units (GPU) 542, specialized programmable processing units in the form of Field Programmable Gate Areas (FPGA) 543, hardware accelerators for certain tasks 544, and so forth. These devices, along with Read-only memory (ROM) 545, Random-access memory 546, internal mass storage such as internal non-user accessible hard drives, SSDs, and the like 547, maybe connected through a system bus 548. In some computer systems, the system bus 548 can be accessible in the form of one or more physical plugs to enable extensions by additional central processing units (CPUs), graphics processing units (GPU), and the like. The peripheral devices may be attached either directly to the core's system bus 548, or through a peripheral bus 549. Architectures for a peripheral bus may include a peripheral component interconnect (PCI), a USB, and the like.

CPUs 541, GPUs 542, FPGAs 543, and accelerators 544 can execute certain instructions that, in combination, can make up the aforementioned computer code. That computer code can be stored in ROM 545 or Random Access Memory (RAM)546. Transitional data can be also be stored in RAM 546, whereas permanent data can be stored, for example, in the internal mass storage 547. Fast storage and retrieval to any of the memory devices can be enabled through the use of cache memory, which can be closely associated with one or more CPU 541, GPU 542, mass storage 547, ROM 545, RAM 546, and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example and not by way of limitation, the computer system having architecture 500, and specifically the core 540 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 540 that are of non-transitory nature, such as core-internal mass storage 547 or ROM 545. The software implementing various embodiments of the present disclosure can be stored in such devices and executed by core 540. A computer-readable medium can include one or more memory devices or chips, according to particular needs. The software can cause the core 540 and specifically the processors therein (including CPU, GPU, FPGA, and the like) to execute particular processes or particular parts of particular processes described herein, including defining data structures stored in RAM 546 and modifying such data structures according to the processes defined by the software. In addition or as an alternative, the computer system can provide functionality as a result of logic hardwired or otherwise embodied in a circuit (for example, accelerator 544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Referring now to FIG. 6, an operational flowchart illustrating the steps of a method 600 for video conferencing is depicted. In some implementations, one or more process blocks may be performed by the computer and the server. In some implementations, one or more process blocks may be performed by another device or a group of devices separate from or including the computer and the server.

Embodiments relate to a method, system, and non-transitory computer readable medium for video conferencing.

As shown in FIG. 6, a method for streaming video data may be provided.

As shown in FIG. 6, the method may include:

Operation 601: receiving, by a user terminal, from an electronic device or a server, a 360° video stream, wherein the 360° video stream includes a multiple overlay parameter that indicates whether overlaying the 360° video stream with two or more overlays is permissible by the user terminal;

Operation 602: displaying, by the user terminal, the 360° video stream;

Operation 603: determining whether the multiple overlay parameter actually indicates that overlaying the 360° video stream with two or more overlays is actually permissible by the user terminal or not.

Operation 604: when the multiple overlay parameter is a first value, determining, by the user terminal, that overlaying the 360° video stream with two or more overlays is permissible by the user terminal, and displaying, by the user terminal, the 360° video stream with the two or more overlays; and Operation 605: when the multiple overlay parameter is a second value, determining, by the user terminal, that overlaying the 360° video stream with two or more overlays is not permissible by the user terminal, and displaying, by the user terminal, the 360° video stream with zero overlays or one overlay.

The first value may be different from the second value, and the overlay or overlays may include one or more of: another video stream, or an image.

The 360° video stream may include an overlap overlays parameter that indicates whether overlapping one of the two or more overlays with a first overlay is permissible.

The method may further comprise: displaying, by the user terminal, the one of the two or more overlays superimposed to overlap the first overlay with the 360° video stream when the overlap overlays parameter indicates that overlapping one of the two or more overlays with the first overlay is permissible.

The 360° video stream may include a content-based attribute that allows use of the two or more overlays.

The 360° video stream may include a flag to signal when the user is allowed to share a sender's stream info with other senders.

The method may further comprise: receiving, by the user terminal, a request from the electronic device or server, wherein the request is a request for one or more users in a teleconference to share media stream attributes; and transmitting, by the user terminal to the electronic device or server, information regarding media stream attributes that the user terminal authorizes sharing of.

The information regarding media stream attributes that the user is willing to share includes an identifier (ID) corresponding to a sender ID.

The method may further comprise: allocating, by the electronic device or server, a unique overlay ID by combining at least one sender ID with at least one overlay ID.

The method may further comprise: negotiating the multiple overlay parameter during an initial offer-answer negotiation or during a session.

The multiple overlay parameter may be offered in a session description protocol (SDP) of the 360° video stream.

The method may further comprise negotiating the overlap overlays parameter during an initial offer-answer negotiation or during a session.

The overlap overlays parameter may be offered in a session description protocol (SDP) of the 360° video stream.

The method may further comprise: negotiating the content-based attribute during an initial offer-answer negotiation or during a session.

The content-based attribute may be offered in a session description protocol (SDP) of the 360° video stream.

The method may further comprise: communicating, by the user terminal to the electronic device or server, whether another user is authorized to share stream information shared by the user terminal with other electronic devices.

The method may further comprise: communicating, by the user terminal to the electronic device or server, whether another user is authorized to share stream information shared by the user terminal with other electronic devices.

The method may further comprise: sharing, by the electronic device or server, at least one additional overlay besides any overlay or overlays produced by the electronic device or server with the other electronic devices, wherein the at least one additional overlay includes only overlays where a sender of the corresponding overlay video authorized sharing of the overlay.

According to an embodiment, a computer system for video conferencing may be provided, which may comprise: a communication interface; a display; one or more computer-readable non-transitory storage media configured to store computer program code; and one or more computer processors configured to access said computer program code and operate as instructed by said computer program code.

The computer program code may include: receiving code configured to cause the one or more computer processors to receive, via the communication interface, a 360° video stream, wherein the 360° video stream includes a multiple overlay parameter that indicates whether overlaying the 360° video stream with two or more overlays is permissible by the user terminal; displaying code configured to cause the one or more computer processors to control the display to display the received 360° video stream; multiple overlay authorized code configured to cause the one or more computer processors to: when the multiple overlay parameter is a first value, determine that overlaying the 360° video stream with two or more overlays is permissible by the user terminal, and control the display to display the 360° video stream with the two or more overlays; and multiple overlay unauthorized code configured to cause the one or more computer processors to: when the multiple overlay parameter is a second value, determine that overlaying the 360° video stream with two or more overlays is not permissible by the user terminal, and control the display to display the 360° video stream with zero overlays or one overlay.

The first value may be different from the second value, and the overlay or overlays may include one or more of: another video stream, or an image.

The 360° video stream may include an overlap overlays parameter that indicates whether overlapping one of the two or more overlays with a first overlay is permissible, and the computer program code may further comprise: overlap overlays authorized code configured to cause the at one or more processors to: control the display to display the one of the two or more overlays superimposed to overlap the first overlay with the 360° video stream when the overlap overlays parameter indicates that overlapping one of the two or more overlays with the first overlay is permissible.

According to an embodiment, a non-transitory computer readable medium having stored thereon a computer program configured to cause one or more computer processors to: receive a 360° video stream, wherein the 360° video stream includes a multiple overlay parameter that indicates whether overlaying the 360° video stream with two or more overlays is permissible; control a display to display the received 360° video stream; when the multiple overlay parameter is a first value, determine that overlaying the 360° video stream with two or more overlays is permissible, and control the display to display the 360° video stream with the two or more overlays; and when the multiple overlay parameter is a second value, determine that overlaying the 360° video stream with two or more overlays is not permissible, and control the display to display the 360° video stream with zero overlays or one overlay, wherein the first value is different from the second value, and wherein the overlay or overlays include one or more of: another video stream, or an image.

The 360° video stream may include an overlap overlays parameter that indicates whether overlapping one of the two or more overlays with a first overlay is permissible, and the computer program may be further configured to cause the one or more computer processors to: control the display to display the one of the two or more overlays superimposed to overlap the first overlay with the 360° video stream when the overlap overlays parameter indicates that overlapping one of the two or more overlays with the first overlay is permissible.

It may be appreciated that the flow charts (e.g., FIG. 6) provide only an illustration of one implementation and does not imply any limitations with regard to how different embodiments may be implemented. Many modifications to the depicted environments may be made based on design and implementation requirements.

The techniques described above can be implemented by one or more processors that may execute computer software having computer-readable instructions that may be physically stored in one or more computer-readable media (e.g., a hard disk drive). For example, FIG. 5 shows a computer system suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things (IoT) devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by a user terminal, from an electronic device or a server, a 360° video stream, wherein the 360° video stream includes a multiple overlay parameter that indicates whether overlaying the 360° video stream with two or more overlays is permissible by the user terminal;
   displaying, by the user terminal, the 360° video stream;
   when the multiple overlay parameter is a first value, determining, by the user terminal, that overlaying the 360° video stream with two or more overlays is permissible by the user terminal, and displaying, by the user terminal, the 360° video stream with the two or more overlays; and when the multiple overlay parameter is a second value, determining, by the user terminal, that overlaying the 360° video stream with two or more overlays is not permissible by the user terminal, and displaying, by the user terminal, the 360° video stream with zero overlays or one overlay, wherein the first value is different from the second value, and wherein the overlay or overlays include one or more of: another video stream, or an image.

2. The method of claim 1, wherein
the 360° video stream includes an overlap overlays parameter that indicates whether overlapping one of the two or more overlays with a first overlay is permissible, and the method further comprises:
displaying, by the user terminal, the one of the two or more overlays superimposed to overlap the first overlay with the 360° video stream when the overlap overlays parameter indicates that overlapping one of the two or more overlays with the first overlay is permissible.

3. The method of claim 1, wherein the 360° video stream includes a content-based attribute that allows use of the two or more overlays.

4. The method of claim 1, wherein the 360° video stream includes a flag to signal when the user is allowed to share a sender's stream info with other senders.

5. The method of claim 1, further comprising:
receiving, by the user terminal, a request from the electronic device or server, wherein the request is a request for one or more users in a teleconference to share media stream attributes; and transmitting, by the user terminal to the electronic device or server, information regarding media stream attributes that the user terminal authorizes sharing of.

6. The method of claim 5, wherein the information regarding media stream attributes that the user is willing to share includes an identifier (ID) corresponding to a sender ID.

7. The method of claim 6, further comprising:
allocating, by the electronic device or server, a unique overlay ID by combining at least one sender ID with at least one overlay ID.

8. The method of claim 1, further comprising: negotiating the multiple overlay parameter during an initial offer-answer negotiation or during a session.

9. The method of claim 1, wherein the multiple overlay parameter is offered in a session description protocol (SDP) of the 360° video stream.

10. The method of claim 2, further comprising: negotiating the overlap overlays parameter during an initial offer-answer negotiation or during a session.

11. The method of claim 2, wherein the overlap overlays parameter is offered in a session description protocol (SDP) of the 360° video stream.

12. The method of claim 3, further comprising: negotiating the content-based attribute during an initial offer-answer negotiation or during a session.

13. The method of claim 3, wherein the content-based attribute is offered in a session description protocol (SDP) of the 360° video stream.

14. The method of claim 4, further comprising: communicating, by the user terminal to the electronic device or server, whether another user is authorized to share stream information shared by the user terminal with other electronic devices.

15. The method of claim 5, further comprising: communicating, by the user terminal to the electronic device or server, whether another user is authorized to share stream information shared by the user terminal with other electronic devices.

16. The method of claim 14, further comprising: sharing, by the electronic device or server, at least one additional overlay besides any overlay or overlays produced by the electronic device or server with the other electronic devices, wherein the at least one additional overlay includes only overlays where a sender of the corresponding overlay video authorized sharing of the overlay.

17. A user terminal for video conferencing, the computer system comprising:
a communication interface;
a display;
one or more computer-readable non-transitory storage media configured to store computer program code; and
one or more computer processors configured to access said computer program code and operate as instructed by said computer program code, said computer program code including:
receiving code configured to cause the one or more computer processors to receive, via the communication interface, a 360° video stream, wherein the 360° video stream includes a multiple overlay parameter that indicates whether overlaying the 360° video stream with two or more overlays is permissible by the user terminal;
displaying code configured to cause the one or more computer processors to control the display to display the received 360° video stream;
multiple overlay authorized code configured to cause the one or more computer processors to: when the multiple overlay parameter is a first value, determine that overlaying the 360° video stream with two or more overlays is permissible by the user terminal, and control the display to display the 360° video stream with the two or more overlays; and
multiple overlay unauthorized code configured to cause the one or more computer processors to: when the multiple overlay parameter is a second value, determine that overlaying the 360° video stream with two or more overlays is not permissible by the user terminal, and control the display to display the 360° video stream with zero overlays or one overlay,
wherein the first value is different from the second value, and
wherein the overlay or overlays include one or more of: another video stream, or an image.

18. The computer system of claim 17, wherein
the 360° video stream includes an overlap overlays parameter that indicates whether overlapping one of the two or more overlays with a first overlay is permissible, and the computer program code further comprises: overlap overlays authorized code configured to cause the at one or more processors to: control the display to display the one of the two or more overlays superimposed to overlap the first overlay with the 360° video stream when the overlap overlays parameter indicates that overlapping one of the two or more overlays with the first overlay is permissible.

19. A non-transitory computer readable medium having stored thereon a computer program for handling a video call, the computer program configured to cause one or more computer processors to:
- receive a 360° video stream, wherein the 360° video stream includes a multiple overlay parameter that indicates whether overlaying the 360° video stream with two or more overlays is permissible;
- control a display to display the received 360° video stream;
- when the multiple overlay parameter is a first value, determine that overlaying the 360° video stream with two or more overlays is permissible, and control the display to display the 360° video stream with the two or more overlays; and
- when the multiple overlay parameter is a second value, determine that overlaying the 360° video stream with two or more overlays is not permissible, and control the display to display the 360° video stream with zero overlays or one overlay, wherein the first value is different from the second value, and wherein the overlay or overlays include one or more of: another video stream, or an image.

20. The non-transitory computer-readable medium of claim 19, wherein
the 360° video stream includes an overlap overlays parameter that indicates whether overlapping one of the two or more overlays with a first overlay is permissible, and
wherein the computer program is further configured to cause the one or more computer processors to: control the display to display the one of the two or more overlays superimposed to overlap the first overlay with the 360° video stream when the overlap overlays parameter indicates that overlapping one of the two or more overlays with the first overlay is permissible.

* * * * *